(12) United States Patent
Figuered et al.

(10) Patent No.: US 9,381,802 B2
(45) Date of Patent: Jul. 5, 2016

(54) PROPULSION WHEEL MOTOR FOR AN ELECTRIC VEHICLE

(71) Applicants: GM GLOBAL TECHNOLOGY OPERATIONS LLC, Detroit, MI (US); The United States of America As Represented by the Administrator of the National Aeronautics and Space Administration, Washington, DC (US)

(72) Inventors: Joshua M. Figuered, Houston, TX (US); Eduardo Herrera, Houston, TX (US); Thomas M. Waligora, Houston, TX (US); William J. Bluethmann, Houston, TX (US); Logan Christopher Farrell, West Lafayette, IN (US); Chunhao J. Lee, Troy, MI (US); Robert L. Vitale, Macomb Township, MI (US); Ross Briant Winn, Houston, TX (US); Raymond Edward Eggleston, IV, Canton, GA (US); Raymond Guo, Seabrook, TX (US); Steven J. Weber, Mount Clemens, MI (US); Lucien Q. Junkin, Houston, TX (US); James Jonathan Rogers, League City, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 184 days.

(21) Appl. No.: 14/061,073

(22) Filed: Oct. 23, 2013

(65) Prior Publication Data

US 2015/0108823 A1 Apr. 23, 2015

(51) Int. Cl.
  *B60K 7/00* (2006.01)
  *B60B 27/00* (2006.01)
  (Continued)

(52) U.S. Cl.
  CPC ........... *B60K 7/0007* (2013.01); *B60B 27/0057* (2013.01); *B60B 27/0068* (2013.01);
  (Continued)

(58) Field of Classification Search
  CPC ............... B60K 7/0007; B60K 17/046; B60K 2007/0038; B60K 2007/0092; H02K 7/14
  See application file for complete search history.

(56) References Cited

U.S. PATENT DOCUMENTS

| | | | | |
|---|---|---|---|---|
| 5,345,777 A | * | 9/1994 | Sekino | B60H 1/00007 180/65.51 |
| 5,443,135 A | * | 8/1995 | Redgrave | F16D 65/08 188/250 F |

(Continued)

OTHER PUBLICATIONS

Article from Green Car Congress, dated Apr. 26, 2013.

*Primary Examiner* — Brodie Follman
(74) *Attorney, Agent, or Firm* — Quinn Law Group, PLLC (57) ABSTRACT

A wheel assembly for an electric vehicle includes a wheel rim that is concentrically disposed about a central axis. A propulsion-braking module is disposed within an interior region of the wheel rim. The propulsion-braking module rotatably supports the wheel rim for rotation about the central axis. The propulsion-braking module includes a liquid cooled electric motor having a rotor rotatable about the central axis, and a stator disposed radially inside the rotor relative to the central axis. A motor-wheel interface hub is fixedly attached to the wheel rim, and is directly attached to the rotor for rotation with the rotor. The motor-wheel interface hub directly transmits torque from the electric motor to the wheel rim at a 1:1 ratio. The propulsion-braking module includes a drum brake system having an electric motor that rotates a cam device, which actuates the brake shoes.

13 Claims, 7 Drawing Sheets

(51) Int. Cl.
  *B60K 17/356* (2006.01)
  *B60K 11/02* (2006.01)
  *B60K 1/00* (2006.01)

(52) U.S. Cl.
  CPC ......... *B60K17/356* (2013.01); *B60B 2900/513* (2013.01); *B60K 11/02* (2013.01); *B60K 2001/006* (2013.01); *B60K 2007/0038* (2013.01); *B60K 2007/0092* (2013.01)

(56) References Cited

U.S. PATENT DOCUMENTS

| | | | | |
|---|---|---|---|---|
| 5,590,747 A * | 1/1997 | Mery | .................. | F16D 51/22 188/326 |
| 5,632,157 A * | 5/1997 | Sekino | ............... | B60H 1/00007 180/65.51 |
| 5,713,427 A * | 2/1998 | Lutz | .................. | B60K 1/02 180/65.245 |
| 5,818,134 A * | 10/1998 | Yang | .................. | B62M 7/12 180/65.31 |
| 5,894,902 A * | 4/1999 | Cho | .................. | B60K 7/0007 180/65.51 |
| 6,328,123 B1 * | 12/2001 | Niemann | ............. | B60K 7/0007 180/65.51 |
| 7,059,437 B2 * | 6/2006 | Heinen | ................ | B60G 3/01 180/65.51 |
| 7,527,114 B2 * | 5/2009 | Wendl | ................ | B60K 7/0007 180/65.51 |
| 7,938,211 B2 * | 5/2011 | Yoshino | ............... | B60K 7/0007 180/65.51 |
| 7,938,212 B2 * | 5/2011 | Sakuma | ............... | B60K 7/0007 180/65.51 |
| 8,067,864 B2 * | 11/2011 | Beetz | ................ | B04B 9/04 251/122 |
| 8,316,973 B2 * | 11/2012 | Walter | ................ | B60K 7/0007 180/65.51 |
| 8,459,386 B2 * | 6/2013 | Pickholz | ............. | B60K 7/0007 180/65.31 |
| 8,944,205 B2 * | 2/2015 | Nord | ................. | B62M 6/65 180/206.6 |
| 9,073,425 B2 * | 7/2015 | Vogler | ................ | B60K 7/0007 |
| 2006/0272871 A1 * | 12/2006 | Murata | ............... | B60G 3/20 180/65.51 |
| 2010/0089671 A1 * | 4/2010 | Trunkenpolz | ........ | B60K 6/485 180/65.23 |
| 2012/0132473 A1 * | 5/2012 | Weber | ............... | B60K 7/0007 180/58 |
| 2013/0187492 A1 * | 7/2013 | Woolmer | .............. | H02K 21/24 310/54 |
| 2013/0264861 A1 * | 10/2013 | Park | .................. | B60K 11/06 301/6.5 |
| 2014/0159468 A1 * | 6/2014 | Heinen | ................ | B60K 7/0007 301/6.3 |
| 2014/0197703 A1 * | 7/2014 | Chamberlin | ........... | H02K 9/22 310/64 |
| 2015/0048696 A1 * | 2/2015 | Kobler | ................ | H02K 21/24 310/44 |
| 2015/0108823 A1 * | 4/2015 | Figuered | .............. | B60K 7/0007 301/6.4 |
| 2015/0137669 A1 * | 5/2015 | Lampic | ................ | B60K 7/0007 310/67 R |

* cited by examiner

PROPULSION WHEEL MOTOR FOR AN ELECTRIC VEHICLE

STATEMENT REGARDING FEDERALLY SPONSORED RESEARCH OR DEVELOPMENT

This invention was made with government support under NASA Space Act Agreement Number SAA-EA-10-017. The invention described herein may be manufactured and used by or for the U.S. Government for U.S. Government (i.e., non-commercial) purposes without the payment of royalties thereon or therefore.

TECHNICAL FIELD

The invention generally relates to a propulsion-braking module for an individual wheel assembly of an electric vehicle.

BACKGROUND

Some electric vehicles incorporate individual propulsion systems into multiple different wheel assemblies of the vehicle. For example, each wheel assembly of such an electric vehicle may include its own individual propulsion system. The individual propulsion systems may include an electric motor, which propels or drives its respective wheel, and may also include a braking system for slowing its respective wheel.

SUMMARY

A wheel assembly for an electric vehicle is provided. The wheel assembly includes a wheel rim that is concentrically disposed about a central axis. The wheel rim extends along the central axis to define an interior region. A propulsion-braking module is disposed within the interior region of the wheel rim. The propulsion-braking module rotatably supports the wheel rim for rotation about the central axis. The propulsion-braking module includes an electric motor having a rotor rotatable about the central axis, and a stator disposed radially inside the rotor relative to the central axis. A motor-wheel interface hub is fixedly attached to the wheel rim for rotation with the wheel rim, and is directly attached to the rotor for rotation with the rotor. The motor-wheel interface hub is operable to directly transmit torque from the electric motor to the wheel rim at a 1:1 ratio.

A propulsion-braking module for a wheel assembly of an electric vehicle is also provided. The propulsion-braking module includes a rotor rotatable about a central axis, and a stator disposed radially inside the rotor relative to the central axis. A motor-wheel interface hub is directly attached to the rotor for rotation with the rotor. The motor-wheel interface hub is operable to directly transmit torque to a wheel rim at a 1:1 ratio. An inner water jacket housing is disposed radially inside the stator relative to the central axis. The inner water jacket housing is operable to circulate a cooling liquid circumferentially about an outer radial surface of the inner water jacket housing, between the outer radial surface of the inner water jacket housing and an inner radial surface of the stator. The inner water jacket housing includes a fluid inlet and a fluid outlet. The outer radial surface of the inner water jacket housing defines a fluid directing groove that is disposed annularly about the outer radial surface of the inner water jacket housing. The fluid directing groove includes a spiral groove about the central axis for directing cooling liquid from the fluid inlet to the fluid outlet. A fluid-electrical interface hub is disposed radially inside the inner water jacket housing relative to the central axis, and is attached to the inner water jacket housing. The fluid-electrical interface hub includes all electrical and fluid connections for the electric motor. A heat conductor is disposed between the inner water jacket housing and an inner diameter of the stator. The heat conductor is operable to transfer heat from the stator to the cooling liquid. The heat conductor includes a metal foam. A vehicle interface adapter is attached to the stator, and is disposed concentrically about the central axis. The vehicle interface adapter is configured for attachment to a steering yoke of an electric vehicle. A rotor clamp is attached to the motor-wheel interface hub for rotation therewith. The rotor clamp secures the vehicle interface adapter between the motor-wheel interface hub and the rotor clamp.

A propulsion-braking module for a wheel assembly of an electric vehicle is also provided. The propulsion-braking module includes a rotor rotatable about a central axis, and a stator disposed radially inside the rotor relative to the central axis. A motor-wheel interface hub is directly attached to the rotor for rotation with the rotor, and is operable to directly transmit torque to a wheel rim. A vehicle interface adapter is attached to the stator, and is disposed concentrically about the central axis. A rotor clamp is attached to the motor-wheel interface hub for rotation therewith. The rotor clamp secures the vehicle interface adapter between the motor-wheel interface hub and the rotor clamp. A brake drum is attached to the rotor clamp. The brake drum includes an aluminum drum heat sink that is disposed on an outer radial surface of the brake drum. A first brake shoe and a second brake shoe are each attached to the vehicle interface adapter, and are arranged to define a pair of diametrically opposed brake shoes. Each of the pair of brake shoes includes a friction surface that is operable to engage a radial inner surface of the brake drum. A cam device is coupled to the vehicle interface adapter. The cam device includes a first cam portion for actuating the first brake shoe, and a second cam portion for actuating the second brake shoe. Rotation of the cam device simultaneously actuates both the first brake shoe and the second brake shoe. The first brake shoe and the second brake shoe each include a roller that is rotatably moveable relative to the first brake shoe and the second brake shoe respectively, for rotatably engaging the first cam portion and the second cam portion respectively. A brake actuator is coupled to the cam device. The brake actuator is operable to rotate the cam device in response to a signal to engage or disengage the pair of brake shoes. The brake actuator includes an electric motor, and a position sensor operable to identify a rotational position of the cam device. A cam support is attached to the vehicle interface adapter and rotatably supports the cam device.

Accordingly, the propulsion-braking module is a compact module unit that is positioned within the interior region of the wheel rim, and attaches the wheel rim to the vehicle. The propulsion-braking module provides independent control to the respective wheel assembly that it is attached to, thereby providing flexibility to control vehicle maneuvers. The propulsion-braking module is a modular unit that may be easily removed, attached, and/or replaced when necessary, thereby reducing maintenance time and costs.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be comprised of any number of hardware, software, and/or firmware components configured to perform the specified functions.

Figure 1:
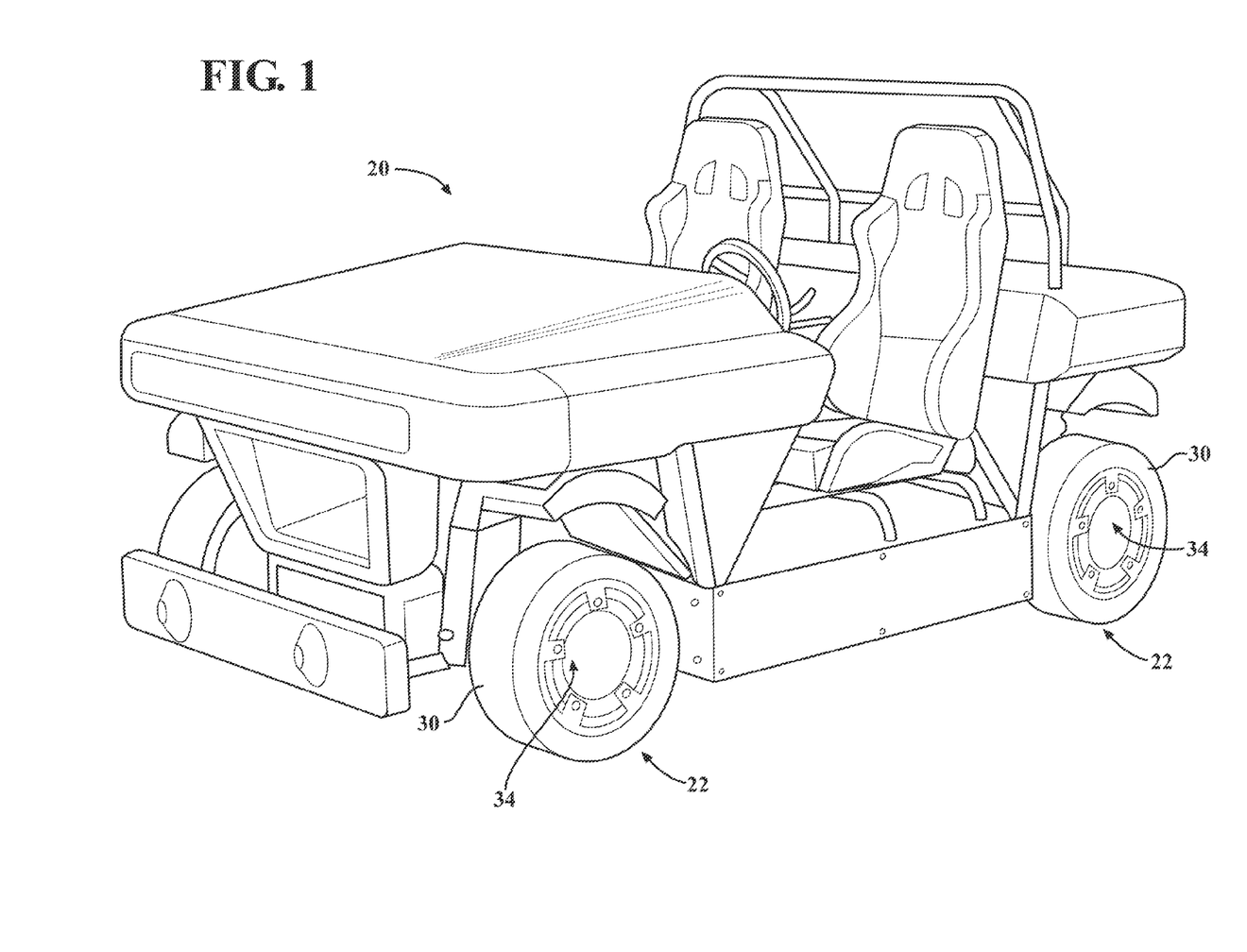
FIG. 1 is a schematic perspective view of an electric vehicle.

Referring to the Figures, wherein like numerals indicate like parts throughout the several views, an electric vehicle is generally shown at 20 in FIG. 1. The electric vehicle 20 includes a wheel assembly 22 disposed at each corner of the electric vehicle 20. Each wheel assembly 22 of the electric vehicle 20 may be identically constructed. While the wheel assemblies 22 are hereinafter referred to in the singular tense, it should be appreciated that the detailed description below may apply to all of the wheel assemblies 22 of the vehicle.

Figure 2:
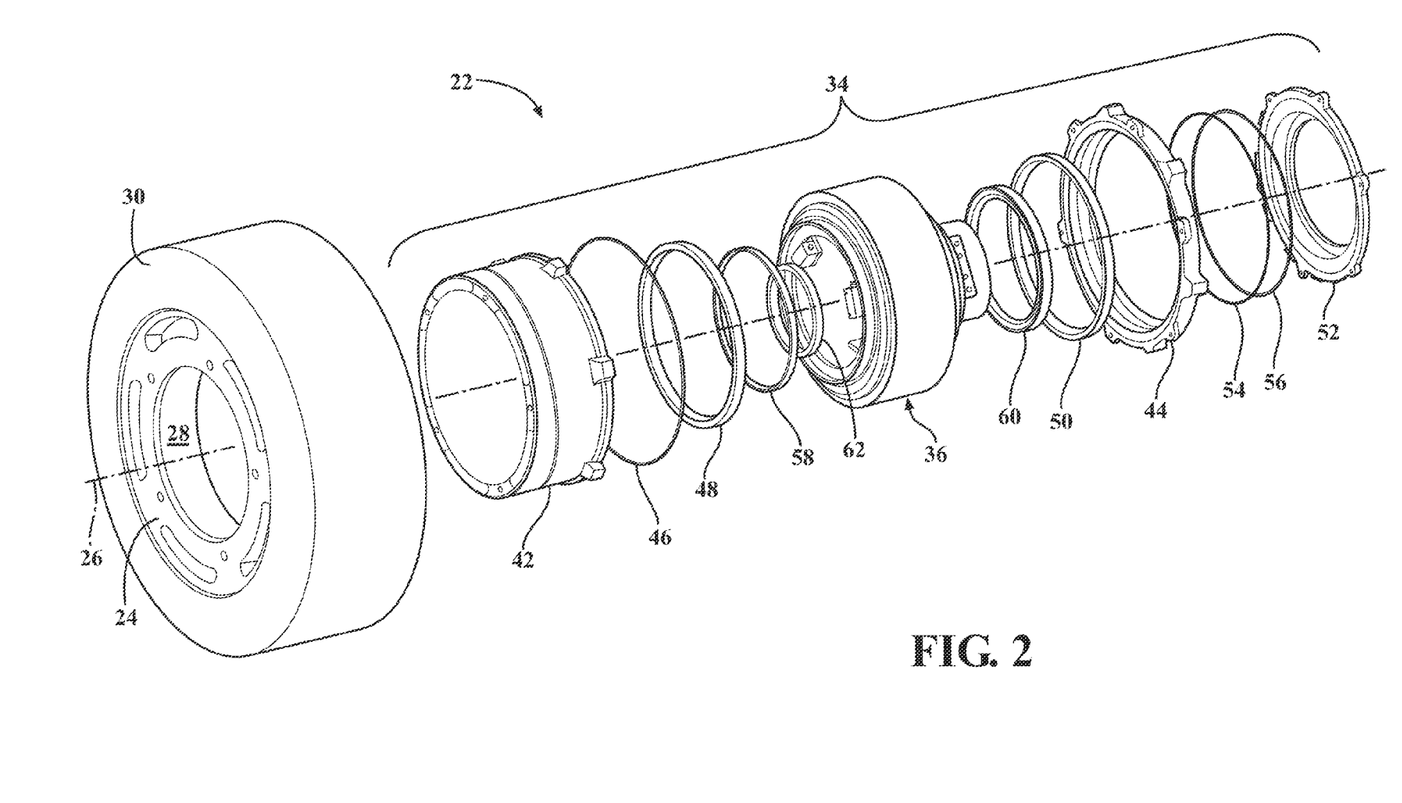
FIG. 2 is a schematic exploded perspective view of a wheel assembly of the electric vehicle.
Figure 3:
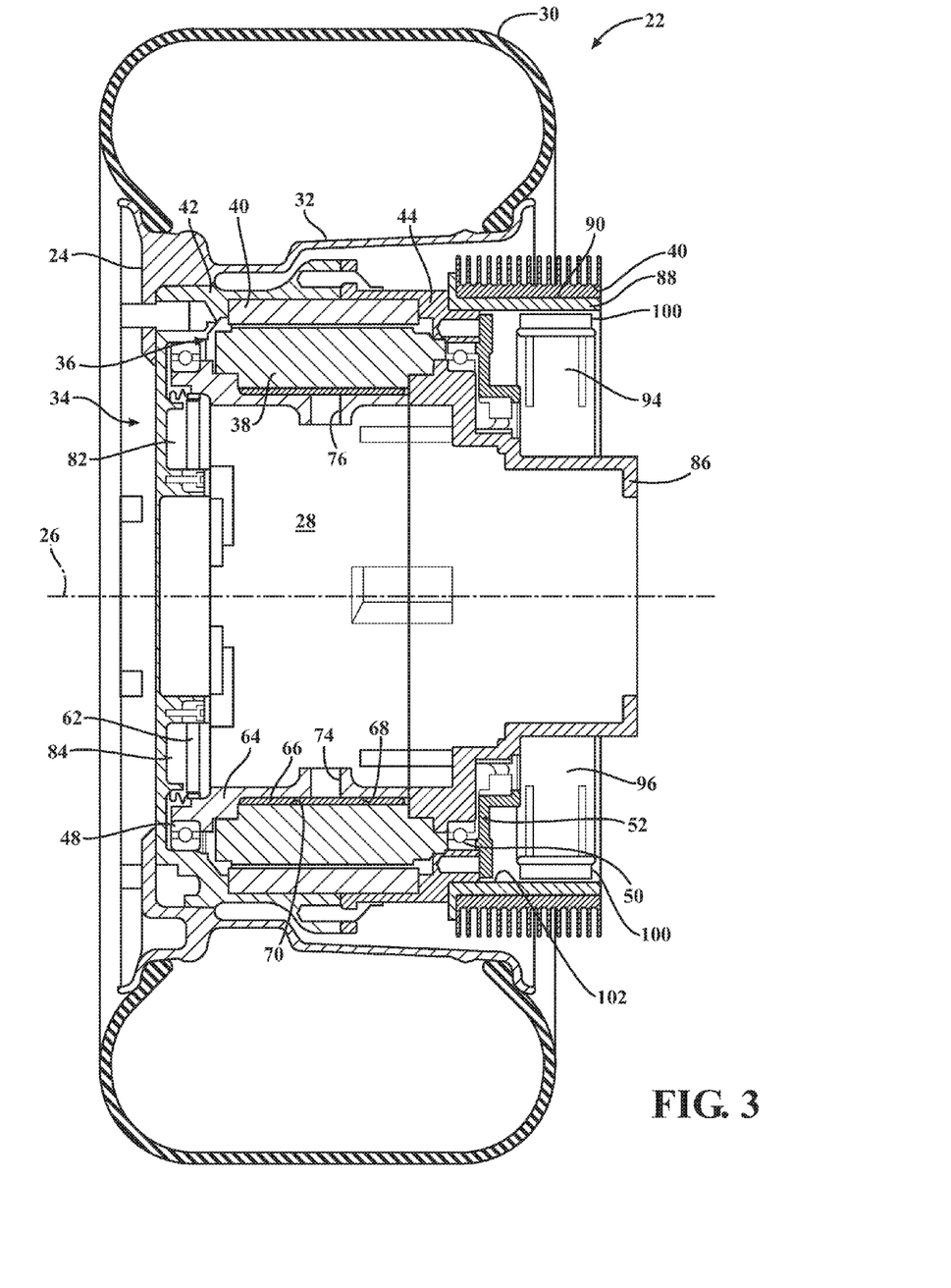
FIG. 3 is a schematic cross sectional view of a propulsion-braking module of the wheel assembly.

Referring to FIGS. 2 and 3, the wheel assembly 22 includes a wheel rim 24 that is concentrically disposed about a central axis 26. The wheel rim 24 extends along the central axis 26 to define an interior region 28. A tire 30 is mounted to the wheel rim 24 in a manner known to those skilled in the art. Accordingly, the tire 30 and an exterior surface 32 of the wheel rim 24 are shaped and/or configured in a manner known to those skilled in the art. As such, the specific details of the tire 30 and the manner in which the tire 30 is mounted to the wheel rim 24 are not described in detail herein.

The wheel assembly 22 includes a propulsion-braking module 34, which is disposed within the interior region 28 of the wheel rim 24. The propulsion-braking module 34 rotatably supports the wheel rim 24 for rotation about the central axis 26, and attaches the wheel rim 24 and tire 30 to the electric vehicle 20. The propulsion-braking module 34 includes an electric motor 36 having a stator 38 and a rotor 40. The electric motor 36 is operable to rotate the rotor 40 about the stator 38 and generate a torque, which is applied to the wheel rim 24 to drive the electric vehicle 20. The electric motor 36 is described in greater detail below.

The propulsion-braking module 34 includes a motor-wheel interface hub 42 that is fixedly attached to the wheel rim 24 for rotation with the wheel rim 24. The motor-wheel interface hub 42 is directly attached to the output of the electric motor 36, i.e., rotor 40, so that the motor-wheel interface hub 42 rotates with the rotor 40. There is no gearing disposed between the output of the electric motor 36 and the wheel rim 24. As such, the motor-wheel interface hub 42 is operable to directly transmit torque from the electric motor 36 to the wheel rim 24 at a 1:1 ratio.

A rotor clamp 44 is attached to the motor-wheel interface hub 42 for rotation therewith. The electric motor 36 is secured between and supported by the motor-wheel interface hub 42 and the rotor clamp 44. An outboard static seal 46 is disposed between the motor-wheel interface hub 42 and the rotor clamp 44 to seal therebetween. The outboard static seal 46 may include any suitable seal material capable of sealing between the motor-wheel interface hub 42 and the rotor clamp 44. An outboard bearing 48 is disposed between the motor-wheel interface hub 42 and the electric motor 36, and rotatably supports the rotor 40 and the motor-wheel interface hub 42 relative to the stator 38. The outboard bearing 48 may include any suitable style of annular bearing. An inboard bearing 50 is disposed between the rotor clamp 44 and the electric motor 36, and rotatably supports the rotor 40 and the rotor clamp 44 relative to the stator 38. The inboard bearing 50 may include any suitable style of annular bearing. An inboard bearing cap 52 axially secures the inboard bearing 50 in position along the central axis 26. The inboard bearing cap 52 is attached to the rotor clamp 44. An inboard static seal 54 and a bearing shim 56 may be disposed between the rotor clamp 44 and the inboard bearing cap 52. The inboard static seal 54 may include any suitable seal material capable of sealing between the rotor clamp 44 and the inboard bearing cap 52. An outboard dynamic seal 58 is disposed and rotatably seals between the motor-wheel interface hub 42 and the electric motor 36. An inboard dynamic seal 60 is disposed and rotatably seals between the electric motor 36 and the inboard bearing cap 52. The outboard dynamic seal 58 and the inboard dynamic seal 60 may include any suitable style of seal capable of sealing a rotating element relative to a fixed, non-rotating element. An encoder disc 62 is attached to and supported by the motor-wheel interface hub 42. The encoder disc 62 provides rotational positional information. The encoder disc 62 may include any suitable encoder capable of providing rotational positional information.

Accordingly, as shown in FIGS. 2 and 3, the motor-wheel interface hub 42 connects the rotor 40 of the electric motor 36 to the wheel rim 24, clamps the outer diameter of the outboard bearing 48, provides the support structure for the encoder disc 62, and serves as the interface for the outboard static seal 46 and the outboard dynamic seal 58. The rotor clamp 44 secures the rotor 40 axially along the central axis 26 relative to the motor-wheel interface hub 42, and provides radial support for the outer diameter of the inboard bearing 50. The inboard bearing cap 52 secures the inboard bearing 50 axially along the central axis 26, and provides radial support to an inner diameter of the inboard bearing 50. The inboard bearing 50 acts to axially constrain the rotating parts of the wheel assembly 22, including the rotor 40, motor-wheel interface hub 42, and the rotor clamp 44.

Figure 4:
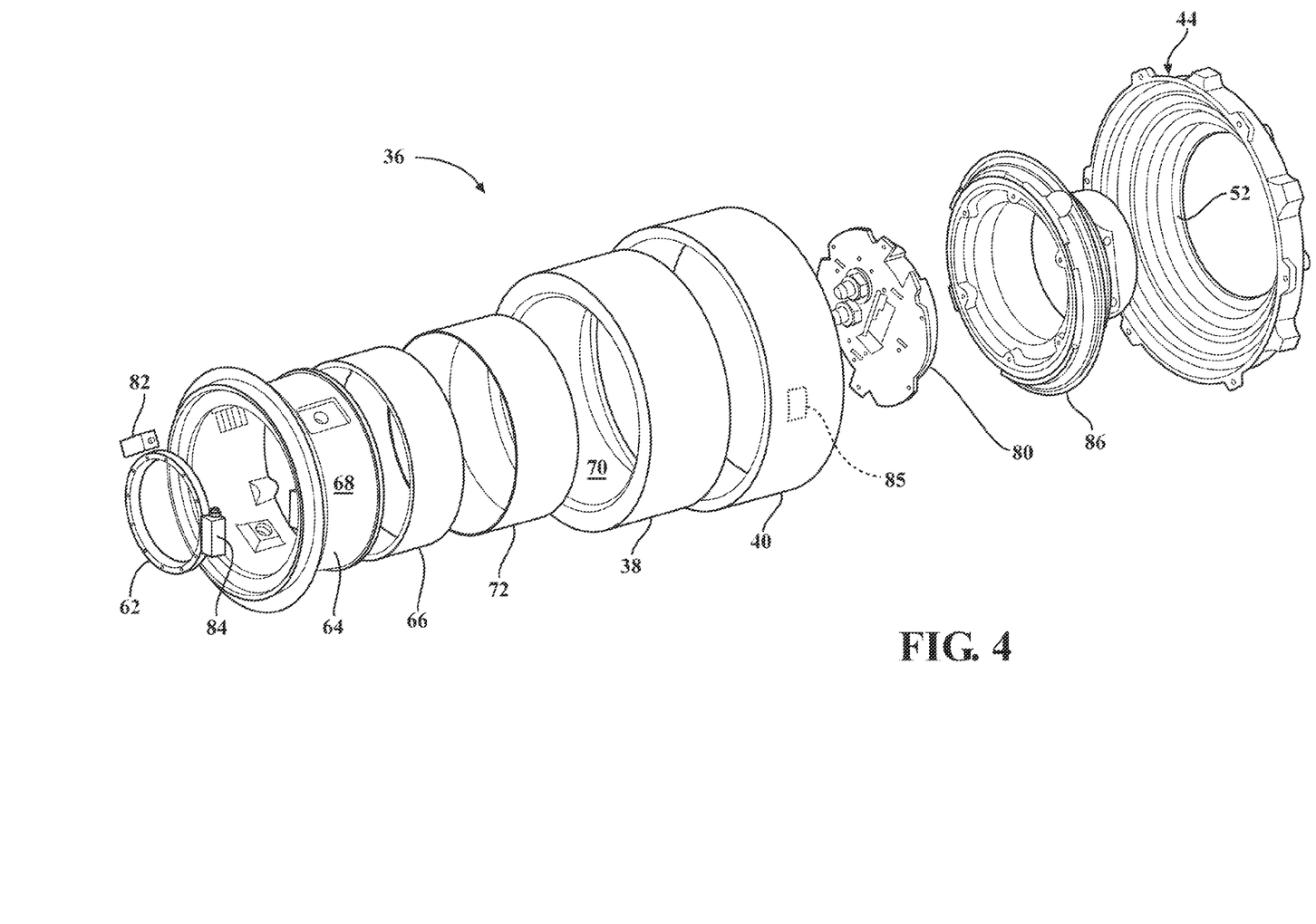
FIG. 4 is a schematic exploded perspective view of an electric motor of the propulsion-braking module.

Referring to FIGS. 3 and 4, the rotor 40 of the electric motor 36 is rotatable about the central axis 26, and the stator 38 is disposed radially inside the rotor 40 relative to the central axis 26. As such, the stator 38 is disposed radially nearer to the central axis 26 than the rotor 40, and the rotor 40 is disposed radially farther from the central axis 26 than the stator 38. Accordingly, the electric motor 36 may be defined as an out-runner motor, in which the rotor 40 rotates about an outer diameter of the stator 38.

A liquid cooling system is disposed radially inside the stator 38, relative to the central axis 26. As shown, the liquid cooling system includes an inner water jacket housing 64, and a heat conductor 66 disposed about an outer radial surface 68 of the inner water jacket housing 64. The inner water jacket housing 64 is disposed radially inside the stator 38 relative to the central axis 26. The inner water jacket housing 64 is operable to circulate a cooling liquid circumferentially about the outer radial surface 68 of the inner water jacket housing 64, between the outer radial surface 68 of the inner water jacket housing 64 and an inner radial surface 70 of the stator 38. An outer water jacket housing 72 is shown disposed annularly about an outer diameter of the heat conductor 66, between the heat conductor 66 and an inner radial surface 70 of the stator 38. The outer water jacket housing 72 is operable to seal the cooling liquid from the inner radial surface 70 of the stator 38. While the exemplary embodiment herein is shown and described to include the outer water jacket housing 72, the electric motor 36 may be designed to eliminate the outer water jacket housing 72.

The heat conductor 66 is disposed between the inner water jacket housing 64 and the inner diameter of the stator 38. The heat conductor 66 is operable to transfer heat from the stator 38 to the cooling liquid. The heat conductor 66 includes and is manufactured from a metal foam. The metal foam is a cellular structure consisting of a solid metal, such as but not limited to aluminum, and containing a large volume fraction of gas-filled pores. The pores may be sealed (closed-cell foam), or the cells may form an interconnected network (open-cell foam).

Figure 5:
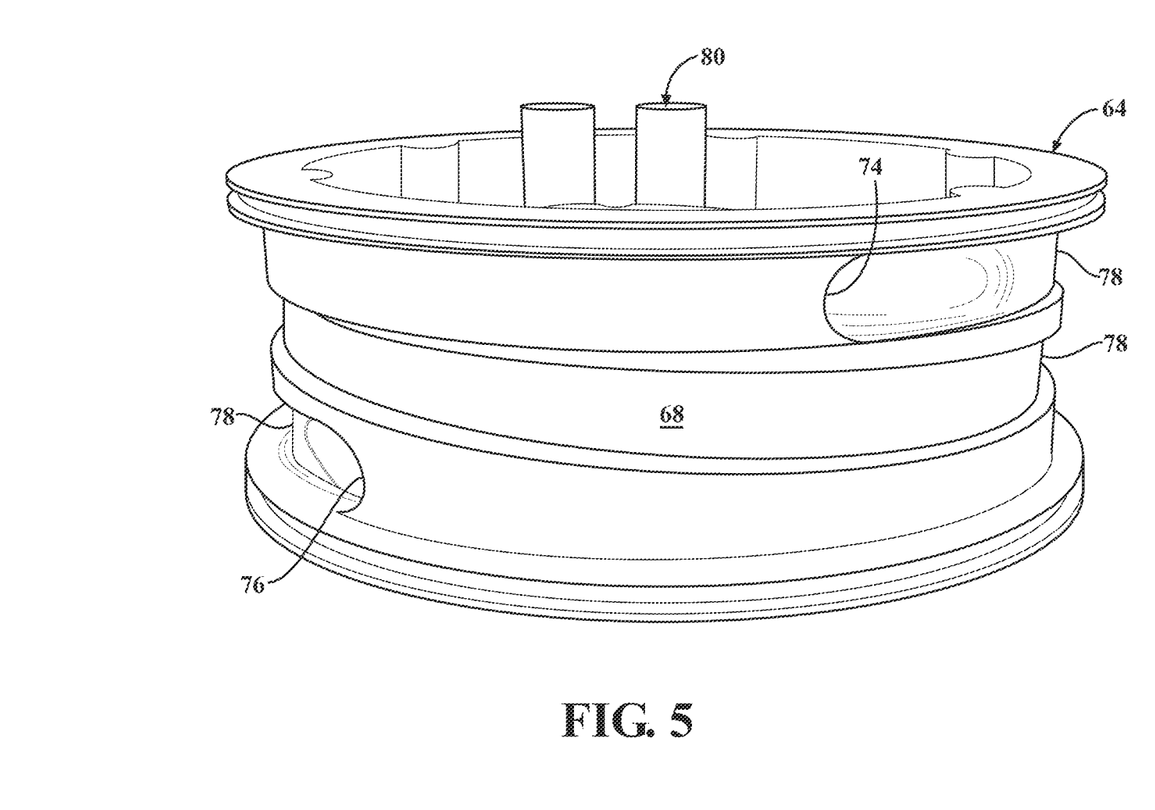
FIG. 5 is a schematic perspective view of an inner water jacket housing of the electric motor.

The inner water jacket housing 64 includes a fluid inlet 74 and a fluid outlet 76. Referring to FIG. 5, the outer radial surface 68 of the inner water jacket housing 64 may define a fluid directing groove 78 disposed annularly about the outer radial surface 68 of the inner water jacket housing 64. The fluid directing groove 78 directs the cooling liquid from the fluid inlet 74 to the fluid outlet 76. Preferably, and as shown in FIG. 5, the fluid directing groove 78 includes a spiral groove about the central axis 26. However, as shown in FIG. 4, the outer radial surface 68 of the inner water jacket housing 64 may not include the fluid directing groove 78.

The electric motor 36 further includes a fluid-electrical interface hub 80, which is disposed radially inside the inner water jacket housing 64 relative to the central axis 26. The fluid-electrical interface hub 80 is attached to the inner water jacket housing 64, and includes all electrical and fluid connections for the electric motor 36. The fluid-electrical interface hub 80 includes blind-mate fluid and electrical connectors to make all required electrical and fluid connections with the electric vehicle 20. Accordingly, all of the electrical and fluid connections are configured for blindly mating with respective connectors on the electric vehicle. This allows the wheel assembly 22 to be attached to a control arm of the electric vehicle 20 via a simple, pre-designed bolt pattern. As such, there is no need to manually connect/disconnect the fluid and electrical connectors, as they automatically align and connect/disconnect without leaking when the wheel assembly 22 is attached to the control arm via the bolt pattern. This greatly simplifies attachment of the wheel assembly 22 to the electric vehicle 20.

A first read head 82 and a second read head 84 are attached to the inner water jacket housing 64, and are positioned to read the encoder disc 62, which is attached to and rotates with the motor-wheel interface hub 42. The first read head 82, the second read head 84, and the encoder disc 62 form a rotary position sensor system for sensing the rotational position of the rotor 38. The first read head 82 and the second read head 84 are identical, and read and provide the same information to a vehicle controller (not shown). Accordingly, the first read head 82 and the second read head 84 provide a redundant encoder reader system. The first read head 82 and the second read head 84 may include any suitable type and/or style of reader capable of reading the encoder disc 62. A hall effect sensor 85 (shown in phantom in FIG. 4) may be embedded into the stator 38. The hall effect sensor is used to detect motor commutation of the electric motor 36, and the speed of the electric motor 36. The hall effect sensor is in communication with the vehicle controller to provide information thereto.

A vehicle interface adapter 86 is attached to the stator 38 and disposed concentrically about the central axis 26. The vehicle interface adapter 86 is configured for attachment to a steering yoke (not shown) of the electric vehicle 20. The vehicle interface adapter 86 provides a pathway, through a central portion thereof located along the central axis 26, for all electrical and fluid connections to pass through the vehicle interface adapter 86 and connect with the fluid-electrical interface hub 80. The vehicle interface adapter 86 is axially secured along the central axis 26, by the inboard bearing cap 52. The vehicle interface adapter 86 clamps the stator 38 axially along the central axis 26, supports the fluid-electrical interface hub 80, is a sealing surface for the inboard dynamic seal 60, and supports the inner diameter of the inboard bearing 50.

It should be appreciated that the electric motor 36 may be used to generate a torque to power the wheel assembly 22. Additionally, when the vehicle 20 must be slowed, the electric motor 36 may be used as a generator to generate electricity, (i.e., regenerative breaking) which may be supplied to a battery (not shown) for storage. The regenerative breaking process, in which the electric motor 36 converts the rotational energy of the wheel assembly 22 into electricity operates to slow down the vehicle.

Figure 6:
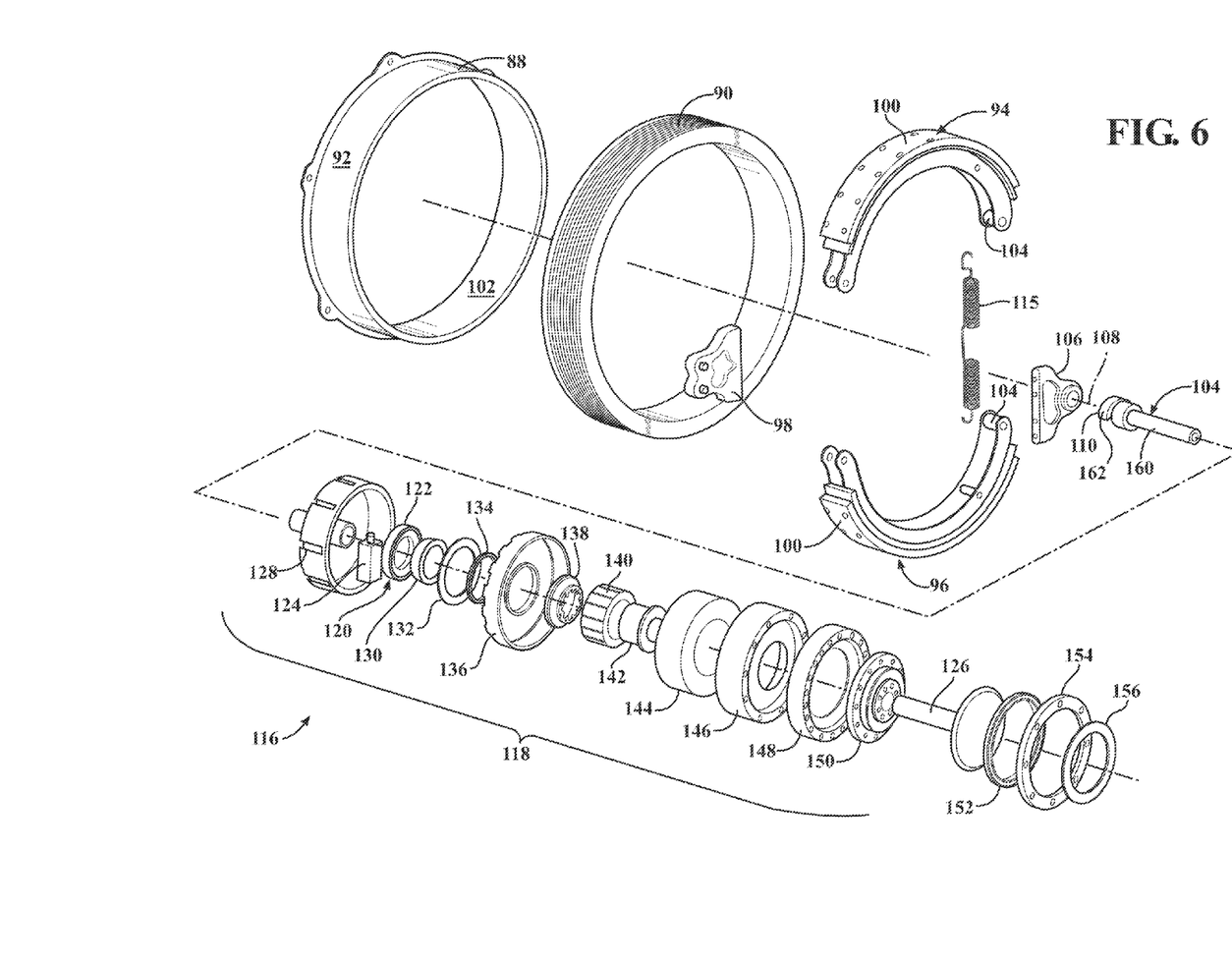
FIG. 6 is a schematic exploded perspective view of a braking system of the propulsion-braking module.
Figure 7:
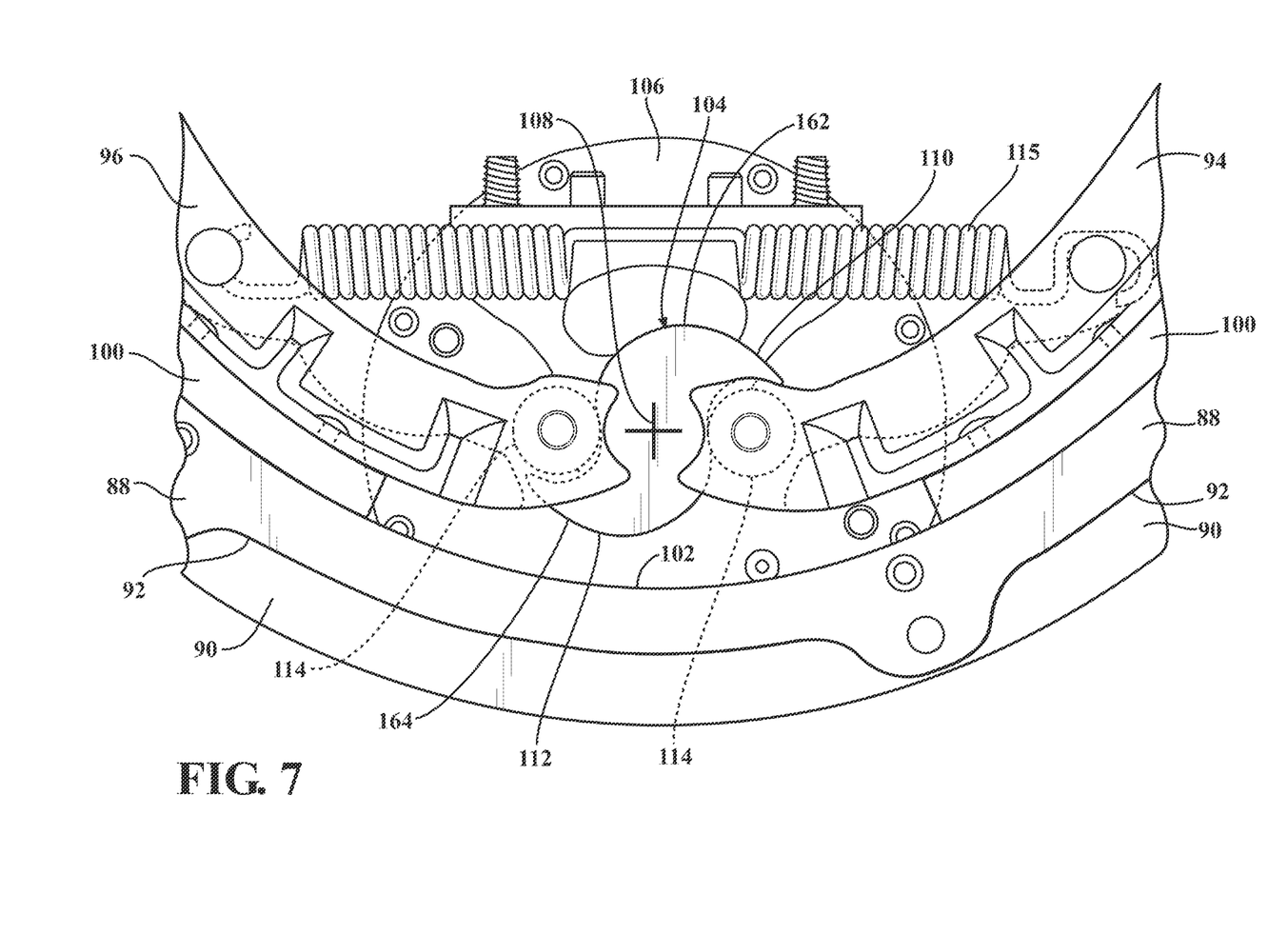
FIG. 7 is a schematic fragmentary cross sectional view of the braking system.

Referring to FIGS. 3, 6 and 7, the propulsion-braking module 34 includes a drum brake system. The drum brake system includes a brake drum 88 that is attached to the rotor clamp 44. The brake drum 88 includes a drum heat sink 90 that is disposed on an outer radial surface 92 of the brake drum 88. Preferably, the drum heat sink 90 includes and is manufactured from aluminum, and is pressed onto the annular brake drum 88.

A first brake shoe 94 and a second brake shoe 96 arranged to define a pair of diametrically opposed brake shoes 94, 96. A brake shoe support 98 is attached to and connects the pair of brake shoes 94, 96 with the vehicle interface adapter 86. Each of the first brake shoe 94 and the second brake shoe 96 are pivotably attached to the brake shoe support 98. Accordingly, each of the first brake shoe 94 and the second brake shoe 96 pivot about a respective axis defined by the connection between the brake shoe support 98 and the respective brake shoe 94, 96. Each of the first brake shoe 94 and the second brake shoe 96 includes a friction surface 100 that is operable to engage a radial inner surface 102 of the brake drum 88.

A cam device 104 is coupled to the vehicle interface adapter 86. More specifically, a cam support 106 is attached to the vehicle interface adapter 86, the cam support 106 rotatably supports the cam device 104 for rotation about a cam axis 108. The cam device 104 includes a first cam portion 110 for actuating the second brake shoe 96, and a second cam portion 112 for actuating the first brake shoe 94. Rotation of the cam device 104 about the cam axis 108 simultaneously actuates both the first brake shoe 94 and the second brake shoe 96. When viewed together, the first cam portion 110 and the second cam portion 112 define a generally S-shaped cross section perpendicular to the cam axis 108.

The first brake shoe 94 and the second brake shoe 96 each include a roller 114 that is rotatably moveable relative to the first brake shoe 94 and the second brake shoe 96 respectively. The first cam portion 110 and the second cam portion 112 engage and/or contact the first brake shoe 94 and the second brake shoe 96 on the roller 114 of each respective brake shoe. Accordingly, the first cam portion 110 and the second cam portion 112 roll across the respective roller 114 of the first brake shoe 94 and the second brake shoe 96 during actuation thereof to reduce friction. A return spring 115 extends between the first brake shoe 94 and the second brake shoe 96, and biases the first brake shoe 94 and the second brake shoe 96 together, and away from frictional engagement with the radial inner surface 102 of the brake drum 88.

A brake actuator 116 is coupled to the cam device 104. The brake actuator 116 is operable to rotate the cam device 104 about the cam axis 108 in response to a signal to engage or disengage the pair of brake shoes 94, 96. Preferably, the brake actuator 116 includes an electric brake motor 118, and actuates the cam device 104 in response to an electric signal. However, it should be appreciated that the brake actuator 116 may include some other actuator, and actuate the cam device 104 in response to some other form of a signal. The brake actuator 116 may include a position sensor 120, including but not limited to an encoder disc 122 and read head 124, which is operable to identify a rotational position of an output shaft 126 of the brake actuator 116. As the output shaft 126 of the brake actuator 116 is directly coupled to the cam device 104, identifying or learning the position of the output shaft 126 of the brake actuator 116 provides the rotational position of the cam device 104 about the cam axis 108. This allows a vehicle controller to precisely control the engagement and disengagement of the brake shoes 94, 96, through all levels of wear of the brake shoes 94, 96. Accordingly, the brake system does not require any mechanisms for adjusting slack in the brake system caused by wear of the brake shoes 94, 96.

The cam device 104 includes a shaft 160 to which the torque from the brake motor 116 is transferred into a force applied to the brake shoes 94, 96. The cross sectional profile of the cam device 104, perpendicular to the cam axis 108, defines a first cam surface 162 of the first cam portion 110 and a second cam surface 164 of the second cam portion 112, which provides a mechanical advantage and acts against the rollers 114 of the second brake shoe 96 and the first brake shoe 94 respectively. The profile of the first cam surface 162 is symmetrical with the profile of the second cam surface 164. The mechanical advantage produced by the first cam surface 162 of the first cam portion 110 and the second cam surface 164 of the second cam portion 112 further increases the braking effort produced by a given torque value of the electric brake motor 118. The profile of the first cam surface 162 and the second cam surface 164 provides a range of motion for the drum brake system. The range of motion defined by the first cam surface 162 of the first cam portion 110 and the second cam surface 164 of the second cam portion 112 is defined by the change in distance of the profiles of the first cam surface 162 and the second cam surface 164 from the cam axis 108. The range of motion also allows for varying thickness of the brake shoes 94, 96 throughout the life of the electric vehicle 20.

As shown in FIG. 6, the electric brake motor 118 includes, as viewed from left to right on the page of FIG. 6, an actuator interface 128, the position sensor 120 including the encoder disc 122 and the read head 124, an encoder disc mount 130, an encoder bearing capture 132, a motor bearing 134, an outboard stator clamp 136, an outboard rotor clamp 138, an actuator rotor 140, an inboard rotor clamp 142, an actuator stator 144, an inboard stator clamp 146, a circular spline mount 148, a harmonic drive 150 (i.e., gear reducer) having a wave generator, the output shaft 126, an output bearing 152, a first bearing clamp 154, and a second bearing clamp 156. The encoder disc mount 130 holds the encoder disc 122 and clamps the motor bearing 134. The outboard stator clamp 136 clamps the actuator stator 144, supports the motor bearing 134 and the read head 124. The inboard rotor clamp 142 clamps the rotor and interfaces with the wave generator of the harmonic drive 150. The circular spline mount 148 interfaces with the circular spline of the harmonic drive 150. The output shaft 126 engages the cam device 104, and interfaces with a flex cup of the harmonic drive 150. The electric brake motor 118 is capable of endlessly rotating the cam device 104 about the cam axis 108. Because the electric brake motor 118 may endlessly rotate the cam device 104 through its full range of camming motion, the brake system does not require any additional mechanisms or devices to account for wear of the brake shoes 94, 96. Additionally, the electric brake motor 118 rotates the cam device 104 in both a clockwise direction and a counterclockwise direction to engage and disengage the brakes. Because the electric brake motor 118 rotates the cam device 104 in both the clockwise direction and the counterclockwise direction, the cam device 104 may be powered in either direction. Accordingly, the electric brake motor 118 may be powered to rotate in one rotational direction to engage the brake shoes 94, 96, and may also be powered in the opposite rotational direction to disengage the brake shoes 94, 96. It should be appreciated that the electric brake motor 118 may be configured in some other manner not shown or described herein, and that the electric brake motor 118 described herein is provided merely for exemplary purposes.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A wheel assembly for an electric vehicle, the wheel assembly comprising:
   a wheel rim concentrically disposed about a central axis and extending along the central axis to define an interior region; and
   a propulsion-braking module disposed within the interior region of the wheel rim, and rotatably supporting the wheel rim for rotation about the central axis, the propulsion-braking module including:
   an electric motor having a rotor rotatable about the central axis, and a stator disposed radially inside the rotor relative to the central axis;
   a motor-wheel interface hub fixedly attached to the wheel rim for rotation with the wheel rim, and directly attached to the rotor for rotation with the rotor, and operable to directly transmit torque from the electric motor to the wheel rim at a 1:1 ratio;
   an inner water jacket housing disposed radially inside the stator relative to the central axis, and operable to circulate a cooling liquid circumferentially about an outer radial surface of the inner water jacket housing, between the outer radial surface of the inner water jacket housing and an inner radial surface of the stator;
   a vehicle interface adapter attached to the stator and disposed concentrically about the central axis; and
   a rotor clamp attached to the motor-wheel interface hub for rotation therewith, and for securing the rotor between the motor-wheel interface hub and the rotor clamp, and radially supporting the vehicle interface adapter relative to the central axis.

2. The wheel assembly as set forth in claim 1 wherein the inner water jacket housing includes a fluid inlet and a fluid outlet, and wherein the outer radial surface of the inner water jacket housing defines a fluid directing groove disposed annularly about the outer radial surface of the inner water jacket housing for directing cooling liquid from the fluid inlet to the fluid outlet.

3. The wheel assembly as set forth in claim 2 wherein the fluid directing groove includes a spiral groove about the central axis.

4. The wheel assembly as set forth in claim 1 wherein the electric motor includes a heat conductor disposed between the inner water jacket housing and an inner diameter of the stator, wherein the heat conductor is operable to transfer heat from the stator to the cooling liquid.

5. The wheel assembly as set forth in claim 1 wherein the propulsion-braking module includes a brake drum attached to the rotor clamp.

6. The wheel assembly as set forth in claim 5 wherein the brake drum includes a drum heat sink disposed on an outer radial surface of the brake drum.

7. The wheel assembly as set forth in claim 5 wherein the propulsion-braking module includes a first brake shoe and a second brake shoe arranged to define a pair of diametrically opposed brake shoes, with each of the pair of brake shoes including a friction surface operable to engage a radial inner surface of the brake drum.

8. The wheel assembly as set forth in claim 7 wherein the propulsion-braking module includes a cam device coupled to the vehicle interface adapter, and including a first cam portion for actuating the first brake shoe, and a second cam portion for actuating the second brake shoe, wherein rotation of the cam device simultaneously actuates both the first brake shoe and the second brake shoe.

9. The wheel assembly as set forth in claim 8 wherein the first brake shoe and the second brake shoe each include a roller rotatably moveable relative to the first brake shoe and the second brake shoe respectively, for rotatably engaging the first cam portion and the second cam portion respectively.

10. The wheel assembly as set forth in claim 9 wherein the propulsion-braking module further includes a brake actuator coupled to the cam device and operable to rotate the cam device in response to a signal to engage or disengage the pair of brake shoes.

11. The wheel assembly as set forth in claim 10 wherein the brake actuator includes an electric motor.

12. The wheel assembly as set forth in claim 10 wherein the brake actuator includes a position sensor operable to identify a rotational position of the cam device.

13. The wheel assembly as set forth in claim 1 wherein the electric motor includes a rotary position sensor and a hall effect sensor.

* * * * *